(12) United States Patent
Kowalchuk et al.

(10) Patent No.: US 12,532,794 B2
(45) Date of Patent: Jan. 27, 2026

(54) SYSTEM AND METHOD FOR CONTROLLING AN AGRICULTURAL SYSTEM BASED ON SLIP

(71) Applicant: CNH Industrial Canada, Ltd., Saskatoon (CA)

(72) Inventors: Trevor Lawrence Kowalchuk, Saskatoon (CA); Nicholas George Alfred Ryder, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 426 days.

(21) Appl. No.: 18/088,970

(22) Filed: Dec. 27, 2022

(65) Prior Publication Data
US 2024/0206363 A1 Jun. 27, 2024

(51) Int. Cl.
*A01B 63/112* (2006.01)
*A01B 63/111* (2006.01)
*A01B 79/00* (2006.01)

(52) U.S. Cl.
CPC .......... *A01B 63/112* (2013.01); *A01B 63/111* (2013.01); *A01B 79/005* (2013.01)

(58) Field of Classification Search
CPC .... A01B 63/112; A01B 63/111; A01B 79/005
See application file for complete search history.

(56) References Cited

U.S. PATENT DOCUMENTS

| | | |
|---|---|---|
| 4,454,919 A | 6/1984 | Arnold et al. |
| 4,518,044 A | 5/1985 | Wiegardt et al. |
| 5,143,159 A | 9/1992 | Young et al. |
| 6,547,012 B2 | 4/2003 | Scarlett et al. |
| 7,172,046 B2 | 2/2007 | Ho et al. |
| 7,954,556 B2 | 6/2011 | Hou et al. |

(Continued)

FOREIGN PATENT DOCUMENTS

| | | |
|---|---|---|
| CN | 211880904 U | 11/2020 |
| DE | 102015000984 A1 | 7/2016 |

(Continued)

OTHER PUBLICATIONS

R. Eaton, J. Katupitiya, K. W. Siew and K. S. Dang, "Precision Guidance of Agricultural Tractors for Autonomous Farming," 2008 2nd Annual IEEE Systems Conference, Montreal, QC, Canada, 2008, pp. 1-8. (Year: 2008).*

(Continued)

*Primary Examiner* — Joan T Goodbody
(74) *Attorney, Agent, or Firm* — Fletcher Yoder, P.C.

(57) ABSTRACT

An agricultural system includes an agricultural implement having a plurality of ground engagement tools. Each of the plurality of ground engagement tools is configured to engage a field and is associated with a respective location on the agricultural implement. The agricultural system also includes a control system with a memory storing instructions and a processor configured to execute the instructions to determine a parameter value associated with slip is outside of a range of values, determine a location on the agricultural implement associated with the parameter value that is outside of the range of values, and output a signal based on the location associated with the parameter value that is outside of the range of values.

20 Claims, 5 Drawing Sheets

(56) References Cited

U.S. PATENT DOCUMENTS

| | | | |
|---|---|---|---|
| 8,346,450 | B2 | 1/2013 | Pohlenz et al. |
| 8,418,776 | B2 | 4/2013 | Pirotais |
| 8,700,270 | B2 | 4/2014 | Foster et al. |
| 8,909,440 | B2 | 12/2014 | Ishikawa et al. |
| 9,994,104 | B2 | 6/2018 | Hertel et al. |
| 10,053,100 | B2 | 8/2018 | Foster et al. |
| 10,073,457 | B2 | 9/2018 | Foster et al. |
| 10,820,474 | B2 | 11/2020 | Pomedli |
| 10,820,491 | B2 | 11/2020 | Kowalchuk |
| 10,980,166 | B2 | 4/2021 | Stanhope et al. |
| 11,064,645 | B2 | 7/2021 | Shearer et al. |
| 11,235,772 | B2 | 2/2022 | Foster et al. |
| 2008/0257569 | A1 | 10/2008 | Foster et al. |
| 2008/0257570 | A1* | 10/2008 | Keplinger ............ A01B 63/145 172/7 |
| 2015/0129249 | A1 | 5/2015 | Sudbrink et al. |
| 2019/0014723 | A1 | 1/2019 | Stanhope et al. |
| 2020/0116479 | A1* | 4/2020 | Shearer ................. G01B 21/18 |
| 2020/0154626 | A1 | 5/2020 | Schoeny et al. |
| 2020/0236835 | A1* | 7/2020 | Stanhope ............. A01B 79/005 |
| 2020/0396889 | A1 | 12/2020 | Kowalchuk |
| 2021/0112697 | A1* | 4/2021 | Rylander ............... B60K 31/00 |
| 2021/0132573 | A1* | 5/2021 | Sporrer ............... A01B 61/046 |
| 2021/0134090 | A1* | 5/2021 | Sporrer ............... A01B 61/046 |
| 2021/0153418 | A1 | 5/2021 | Lupu et al. |
| 2021/0195821 | A1 | 7/2021 | Knobloch |
| 2022/0064905 | A1 | 3/2022 | Bailly et al. |
| 2023/0320249 | A1* | 10/2023 | Vandike ............... A01D 41/127 701/50 |

FOREIGN PATENT DOCUMENTS

| | | | | |
|---|---|---|---|---|
| EP | 2907368 | A1 | 8/2015 | |
| EP | 3815484 | B1 * | 8/2023 | ........... G07C 5/0841 |
| FR | 2533409 | A1 | 3/1984 | |
| JP | 2021192595 | A | 12/2021 | |
| KR | 101869466 | B1 | 6/2018 | |

OTHER PUBLICATIONS

J. De Baerdemaeker, A. Munack, H. Ramon and H. Speckmann, "Mechatronic systems, communication, and control in precision agriculture," in IEEE Control Systems Magazine, vol. 21, No. 5, pp. 48-70, Oct. 2001. (Year: 2001).*

J. Katupitiya, R. Eaton and T. Yaqub, "Systems Engineering Approach to Agricultural Automation: New Developments," 2007 1st Annual IEEE Systems Conference, Honolulu, HI, USA, 2007, pp. 1-7. (Year: 2007).*

U.S. Appl. No. 18/101,266, filed Jan. 25, 2023, Trevor Lawrence Kowalchuk.

Kelly Tractors, "MT800C/MT900C," modified on Jan. 13, 2009, pp. 1-24, https://www.kellytractor.com/eng/images/pdf/agriculture/rubbertired_tractors/mt900c_specsheet.pdf.

De Melo, Rodnei Regis et. al., "Wheel Slip Control Applied to an Electric Tractor for Improving Tractive Efficiency and Reducing Energy Consumption," Jun. 15, 2022, pp. 1-32, Sensors, https://www.ncbi.nlm.nih.gov/pmc/articles/PMC9231405/.

Zhu, Shaohua et al., "Measuring Method of Slip Ratio for Tractor Driving Wheels Based on Machine Vision," Feb. 17, 2022, pp. 1-16, Agriculture, https://www.mdpi.com/2077-0472/12/2/292.

* cited by examiner

SYSTEM AND METHOD FOR CONTROLLING AN AGRICULTURAL SYSTEM BASED ON SLIP

BACKGROUND

The disclosure relates generally to an agricultural system and, more specifically, to a system and a method for controlling an agricultural system based on an operating parameter associated with slip.

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be noted that these statements are to be read in this light, and not as admissions of prior art.

Agricultural systems are used to farm a field, and a particular agricultural system may include a work vehicle and an agricultural implement towed behind the work vehicle. The agricultural implement may perform a farming operation, such as tilling, planting, seeding, and so forth, and the work vehicle may move across a field to drive the agricultural implement across the field. The work vehicle and agricultural implement may have a different set of wheels to enable traversal of the field. The agricultural implement may also include a tool or component that may engage the field during operation.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, an agricultural system includes an agricultural implement having a plurality of ground engagement tools. Each of the plurality of ground engagement tools is configured to engage a field and is associated with a respective location on the agricultural implement. The agricultural system also includes a control system with a memory storing instructions and a processor configured to execute the instructions to determine a parameter value associated with slip is outside of a range of values, determine a location on the agricultural implement associated with the parameter value that is outside of the range of values, and output a signal based on the location associated with the parameter value that is outside of the range of values.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
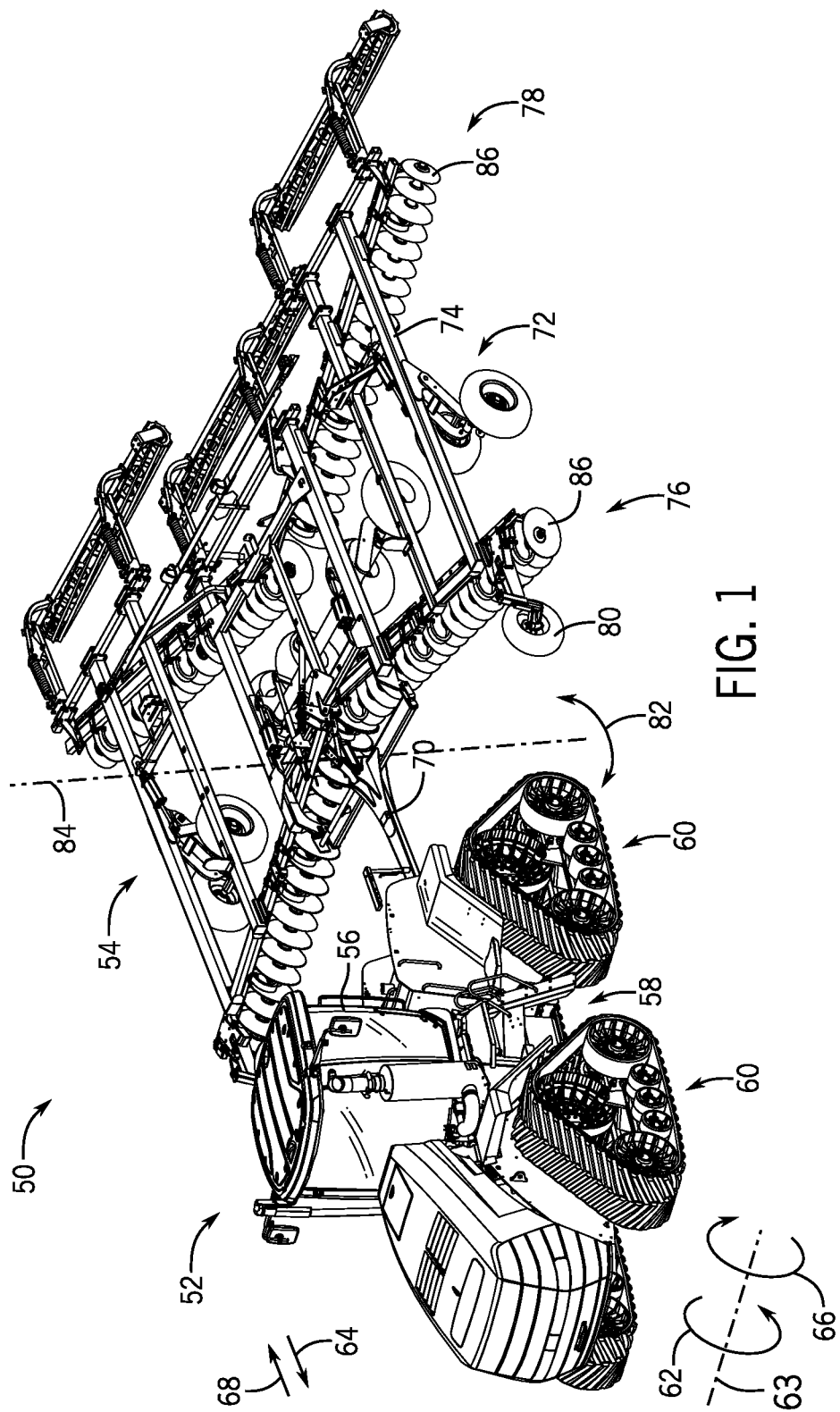
FIG. 1 is a perspective view of an embodiment of an agricultural system having a work vehicle and an agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system used to farm a field. The agricultural system may include an agricultural implement that may perform a farming operation. The agricultural implement may be attached to a work vehicle that moves across the field to enable the agricultural implement to perform the farming operation on the field. The agricultural implement may include a tool that engages with the field during operation of the agricultural system. For example, the tool may include a blade configured to engage the field to facilitate tilling of the field, a disc (e.g., an opener disc) configured to engage the field to form an opening in the field, a forming point configured to engage the field to shape an opening formed in the field (e.g., by an opener disc), another suitable tool, or any combination thereof.

In some circumstances, the wheels and/or tracks of the work vehicle may slip relative to the field surface. That is, a ground engaging surface of the wheel and/or track may move at a different speed (e.g., a higher linear speed) than a target speed, such as a ground speed (e.g., a linear ground speed, an expected ground speed) of the agricultural system. For example, the field may have soft soil (e.g., caused by a high moisture content) that reduces a coefficient of friction between the wheels/tracks and the field and increases the likelihood of inducing slip. Engagement between the tool of the agricultural implement and the field may apply a force that reduces the ground speed of the agricultural system, thereby further increasing the likelihood of slip between the wheels/tracks and the field. Increased slippage may cause the soil under the wheels/tracks of the work vehicle to become compacted and/or rutted. In addition, the work vehicle may become stuck in the soil (e.g., as the wheels/tracks dig into the soil surface). The process of extracting a stuck work vehicle may be significantly time-consuming and may reduce efficiency of field operations.

Thus, it is desired to monitor an operating parameter indicative of potential slip of the work vehicle to significantly reduce the possibility of the work vehicle being stuck in the field. For example, embodiments of the present disclosure are directed to monitoring the operating parameter indicative of slip and reducing engagement between a tool of the agricultural implement and the field in response to determining the operating parameter indicates potential slippage. The agricultural system may include a control system configured to control operation of the agricultural implement based on the operating parameter. The control system may receive values of the operating parameter at different locations at, in, or on the agricultural implement and compare each operating parameter value with a corresponding target range of values. The target range of values may be associated with no-slip conditions (e.g., an amount of slip being below a threshold amount of slip). Thus, an operating parameter value being within the corresponding target range of values may indicate that a current operation of the agricultural implement may not cause the work vehicle to slip. As such, no operational adjustments of the agricultural system may be performed based on the operating parameter value being within the target range of values. However, the operating parameter value being outside of the corresponding target range of values may indicate that a current operation of the agricultural implement may cause the work vehicle to slip. As a result, in response to determining the operating parameter value is outside of the corresponding target range of values, the control system may output a control signal to adjust operation of the agricultural system to reduce the likelihood of slip of the work vehicle at a location associated with the operating parameter value. In some embodiments, the operating parameter may include a linear speed of a wheel and/or track of the agricultural implement (e.g., a speed of a surface of the wheel and/or track along the field) relative to a ground speed of the agricultural implement (e.g., during linear movement of the agricultural implement) and/or based on a radius of curvature of movement of the agricultural implement (e.g., during a turn or rotational movement of the agricultural implement).

The control signal may cause a ground engagement tool at a location corresponding to the location associated with the operating parameter value to adjust positioning with respect to the field to reduce engagement between the ground engagement tool and the field. Thus, the likelihood of slip of the work vehicle caused by the ground engagement tool may be reduced. However, the engagement between an additional ground engagement tool and the field may be maintained in response to a determination that the additional ground engagement tool may not likely cause slip of the work vehicle (e.g., based on the operating parameter value at the location associated with the additional ground engagement tool being within the corresponding target range of values). Indeed, the respective positionings of ground engagement tools with respect to the field may be independently adjusted relative to one another based on the particular parameter values at the locations of the ground engagement tools. In this manner, the likelihood of slip of the work vehicle caused by operation of the agricultural implement may be sufficiently reduced without adjusting the position of additional ground engagement tool(s). Thus, efficient or desirable operation of the agricultural system via the additional ground engagement tool(s) may be maintained.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle may be an on-road truck, a harvester, and so forth, that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like, to facilitate operation of the work vehicle 52. Additionally, the work vehicle 52 includes tracks 60 that operate to move the work vehicle 52. For example, the front and/or the rear tracks 60 may rotate in a first rotational direction 62 (e.g., a forward rotational direction) about a lateral axis 63 to drive the work vehicle 52 in a first direction 64 (e.g., a forward direction), and the front and/or rear tracks 60 may rotate in a second rotational direction 66 (e.g., a reverse rotational direction) about the lateral axis 63, opposite the first rotational direction 62, to drive the work vehicle 52 in a second direction 68 (e.g., a backward direction), opposite the first direction 64. The tracks 60 (e.g., the front tracks and/or the rear tracks) may also be steered to turn the work vehicle 52. In additional or alternative embodiments, a portion (e.g., a rear portion) of the chassis may rotate relative to a remaining portion (e.g., a front portion) of the chassis to steer the work vehicle. In further embodiments, the work vehicle may have tires/tracks or any combination of tracks and/or tires/tracks.

The cab 56 is configured to house an operator of the work vehicle 52 during operation of the agricultural system 50. The cab 56 may provide access to various controls of the work vehicle 52. For example, the cab 56 may include a user interface to enable the operator to control the operation of certain systems of the work vehicle 52. In some embodiments, the cab 56 may include a component, such as a steering wheel, to enable the operator to steer the tracks 60 to turn the work vehicle 52. In addition, the cab 56 may include other and/or additional types of user interfaces (e.g., a touch screen, a hand controller, a push button, a track pad) configured to receive user input or feedback for controlling various operations and systems of the work vehicle 52.

Moreover, the chassis 58 is coupled to the agricultural implement 54 to enable the work vehicle 52 to tow the agricultural implement 54. For example, the chassis 58 may be coupled to a hitch 70 of the agricultural implement 54 (e.g., via a corresponding hitch of the work vehicle). In addition, the agricultural implement 54 includes main wheels 72 that enable the agricultural implement 54 to move, such as through the field through which the work vehicle 52 is navigating. Thus, movement of the work vehicle 52 drives movement of the agricultural implement 54. For example, movement of the work vehicle 52 in the first direction 64 drives the agricultural implement 54 to move in the first direction 64, and movement of the work vehicle 52 in the second direction 68 drives the agricultural implement 54 to move in the second direction 68. In certain embodiments, the agricultural implement 54 may also be steerable. By way of example, the main wheels 72 may be turned to steer the agricultural implement 54.

In some embodiments, the agricultural implement 54 may be a tilling implement (e.g., vertical tilling implement) configured to break up soil within the field during operation of the agricultural system 50. The agricultural implement 54 includes a frame 74 to which the main wheels 72 are coupled. As illustrated in FIG. 1, the main wheels 72 are located between a first end 76 (e.g., front end) of the agricultural implement 54 and a second end 78 (e.g., rear end) of the agricultural implement 54. The agricultural implement 54 includes gauge wheels 80 that are coupled to the frame 74, such as at the first end 76. The gauge wheels 80 may be used to reduce an amount of lateral and/or vertical movement of the agricultural implement 54 while the agricultural system 50 is in operation. For example, the gauge wheels 80 may engage the soil surface while the work vehicle 52 tows the agricultural implement 54, such that movement of the agricultural implement 54 relative to the lateral axis 63, movement of the agricultural implement 54 relative to a vertical axis 84, rotation in third rotational directions 82, or a combination thereof, is reduced.

The agricultural implement 54 also includes disc blades 86 that are rotatably coupled to the frame 74. In the illustrated embodiment, the disc blades 86 of the agricultural implement 54 are arranged in rows. In some embodiments, the blade rows may form an X-shaped configuration on the agricultural implement 54. In additional or alternative embodiments, the disc blades may be arranged in a different configuration on the agricultural implement (e.g., a k-shaped configuration, a diamond configuration, a parallel configuration), and/or the agricultural implement may include a different number of rows of disc blades.

During operation of the agricultural system 50, the disc blades 86 may engage soil of the field. For instance, the main wheels 72 may be positioned to set the position of the frame 74 at a target height above the soil surface. By way of example, the main wheels 72 may move away from the frame 74 to move the frame 74 away from the soil surface, and the main wheels 72 may move toward the frame 74 to move the frame 74 toward the soil surface. As the agricultural implement 54 is towed by the work vehicle 52, the disc blades 86 may rotate while engaged with the soil to till the soil. Each disc blade 86 may, for example, be non-translatably coupled to the frame 74, such that movement of the main wheels 72 relative to the frame 74 changes the position of the disc blades 86 relative to the soil surface (e.g., to engage or disengage the disc blades 86 from the soil). In some embodiments, the disc blades 86 may be concave or may have certain surface features (e.g., flutes) that facilitate tilling of the soil. In additional or alternative embodiments, the agricultural implement may include other suitable type(s) of ground engagement tool(s) (e.g., alone or in combination with the disc blades), such as tillage points, tines, and so forth.

Although the position of the disc blades 86 relative to the soil surface is adjusted by controlling the position of the main wheels in the illustrated embodiment, in additional or alternative embodiments, the position of the disc blades may be adjusted in other manners. For example, the hitch may be raised and/or lowered relative to the soil surface (e.g., via adjustment of the hitch of the work vehicle) to adjust the position and/or a pitch of the agricultural implement, thereby adjusting the position of the disc blades relative to the soil surface. In further embodiments, the disc blades may be directly vertically adjustable relative to the implement frame. For example, the vertical position of group(s) of disc blades may be adjustable via sub-frame(s) of the agricultural implement. Further still, each disc blade or other ground engagement tool may be separately moved, such as by individually raising and/or lowering relative to the soil surface.

In additional or alternative embodiments, the agricultural implement may have any suitable alternate configuration, such as having no gauge wheels, having no main wheels, having tracks, having any other suitable configuration, or any combination thereof. The agricultural implement may also be a different type or configuration of a tilling implement, or the agricultural implement may be a different type of implement, such as a planter, a seeder, a harvester, a sprayer, a mower, and the like, and may be configured to perform a different farming operation on the field.

Figure 2:
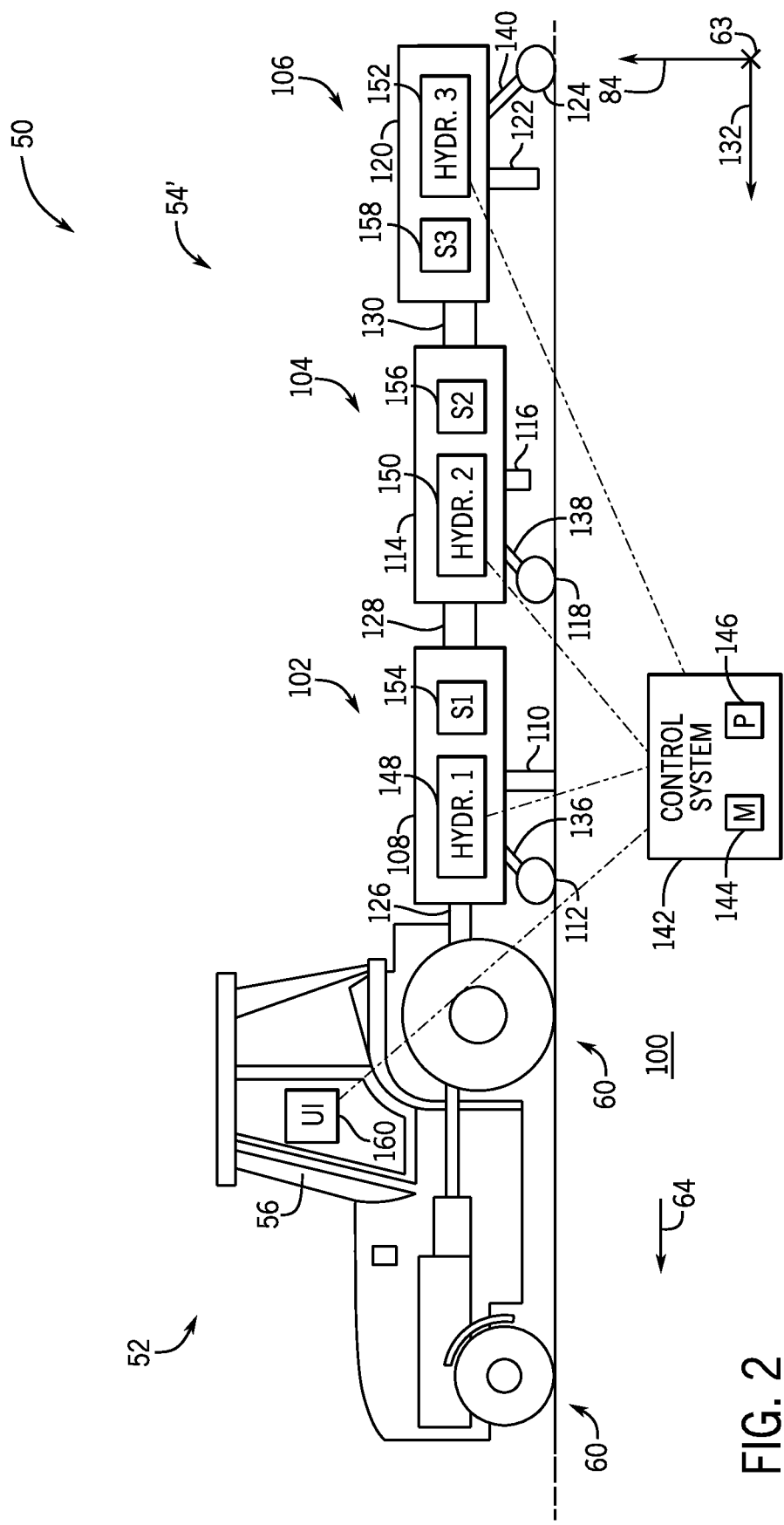
FIG. 2 is a schematic diagram of an embodiment of the agricultural system of FIG. 1, having a work vehicle and an agricultural implement, in accordance with an aspect of the present disclosure.

FIG. 2 is a schematic diagram of an embodiment of the agricultural system 50 having the work vehicle 52 and the agricultural implement 54'. The agricultural system 50 may navigate and perform a farming operation on a field 100 (e.g., a surface of the field, the ground of the field, the soil of the field). The agricultural implement 54' includes a first section 102, a second section 104, and a third section 106. The sections 102, 104, 106 include respective frames, ground engagement tools (e.g., blades), and wheels (e.g., main wheels, gauge wheels). That is, the first section 102 includes a first frame 108, a first ground engagement tool 110 coupled to the first frame 108, and first wheels 112 rotatably coupled to the first frame 108. The second section 104 includes a second frame 114, a second ground engagement tool 116 coupled to the second frame 114, and second wheels 118 rotatably coupled to the second frame 114. The third section 106 includes a third frame 120, a third ground engagement tool 122 coupled to the third frame 120, and third wheels 124 rotatably coupled to the third frame 120. During operation of the agricultural system 50, a respective position of each ground engagement tool 110, 116, 122 with respect to the field 100 and/or a respective depth in which each ground engagement tool 110, 116, 122 is inserted into the field 100 may be controlled to perform the farming operation. Although the illustrated agricultural implement 54' includes three sections 102, 104, 106, the agricultural implement may have any other suitable quantity of sections, such as two sections or more than three sections in additional or alternative embodiments. Moreover, the frame of each section may have any suitable quantity of ground engagement tools, such as multiple ground engagement tools or no ground engagement tools. Indeed, each frame may have a different quantity of ground engagement tools.

The sections 102, 104, 106 may also be movable relative to the work vehicle 52 and relative to one another. For example, the first frame 108 may be coupled to the work vehicle 52 via a first pivot connection 126 (e.g., a first hitch connection), the first frame 108 and the second frame 114 may be coupled to one another via a second pivot connection 128 (e.g., a second hitch connection), and the second frame 114 and the third frame 120 may be coupled to one another via a third pivot connection 130 (e.g., a third hitch connection). The pivot connections 126, 128, 130 may enable movement of the sections 102, 104, 106 relative to the work vehicle 52 and/or relative to one another with respect to the lateral axis 63 (e.g., translation along the lateral axis 63, rotation about the lateral axis 63), with respect to the vertical axis 84 (e.g., translation along the vertical axis 84, rotation about the vertical axis 84), with respect to a longitudinal axis 132 (e.g., translation along the longitudinal axis 132, rotation about the longitudinal axis 132), any other suitable movement, or any combination thereof.

In some embodiments, the wheels 112, 118, 124 may be used to move the sections 102, 104, 106 relative to the work vehicle 52 and/or relative to one another. By way of example, the wheels 112, 118, 124 may move relative to the corresponding frames 108, 114, 120 to adjust a distance between the respective frames 108, 114, 120 and the field 100. For instance, the first wheels 112 are coupled to the first frame 108 via a first strut 136, the second wheels 118 are coupled to the second frame 114 via a second strut 138, and the third wheels 124 are coupled to the third frame 120 via a third strut 140. Rotation of the struts 136, 138, 140 about the lateral axis 63 relative to the respective frames 108, 114, 120 to orient the struts 136, 138, 140 more perpendicularly relative to the field 100 (e.g., to align the struts 136, 138, 140 along the vertical axis 84) may drive the respective frames 108, 114, 120 away from the field 100. Rotation of the struts 136, 138, 140 about the lateral axis 63 relative to the respective frames 108, 114, 120 to orient the struts 136, 138, 140 more parallel to the field 100 (e.g., to align the struts 136, 138, 140 along the longitudinal axis 132) may drive the respective frames 108, 114, 120 toward the field 100. Such movement of the frames 108, 114, 120 relative to the field 100 may adjust the respective positions and/or the respective depths of insertion of the ground engagement tools 110, 116, 122 with respect to the field 100.

The agricultural system 50 may include or be communicatively coupled to a control system 142 (e.g., an automation controller, a programmable controller, an electronic controller, a cloud computing system, control circuitry) having a memory 144 and a processor 146 (e.g., processing circuitry) configured to execute software code or instructions stored on the memory 144, such as to control operation of various components of the agricultural system 50. The term "code" or "software code" used herein refers to any instructions or set of instructions that control the operation of the control system 142. The code or software code may exist in a computer-executable form, such as machine code, which is the set of instructions and data directly executed by the processor 146 of the control system 142, human-understandable form, such as source code, which may be compiled in order to be executed by the processor 146 of the control system 142, or an intermediate form, such as object code, which is produced by a compiler. As used herein, the term "code" or "software code" also includes any human-understandable computer instructions or set of instructions, such as a script, that may be executed on the fly with the aid of an interpreter executed by the processor 146 of the control system 142.

As an example, the memory 144 may store processor-executable software code or instructions (e.g., firmware or software), which are tangibly stored on a tangible computer readable medium. Additionally or alternatively, the memory may store data. As an example, the memory 144 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 146 may include multiple microprocessors, one or more "general-purpose" microprocessors, one or more special-purpose microprocessors, and/or one or more application specific integrated circuits (ASICS), or some combination thereof. For example, the processor 146 may include one or more reduced instruction set (RISC) or complex instruction set (CISC) processors. The control system 142 may be disposed on the work vehicle 52, on the agricultural implement 54', or at a remote location and configured to operate the agricultural system 50.

The control system 142 is configured to cause the positions of the frames 108, 114, 120 to adjust relative to the field 100, thereby adjusting the respective positions and/or the respective depths of insertion of the ground engagement tools 110, 116, 122 with respect to the field 100. For example, the illustrated sections 102, 104, 106 include respective hydraulic circuits. That is, the first section 102 includes a first hydraulic circuit 148 (e.g., disposed within or at the first frame 108) configured to move the first strut 136, the second section 104 includes a second hydraulic circuit 150 (e.g., disposed within or at the second frame 114) configured to move the second strut 138, and the third section 106 includes a third hydraulic circuit 152 (e.g., disposed within or at the third frame 120) configured to move the third strut 140. The hydraulic circuits 148, 150, 152 may be used to control positioning of the respective wheels 112, 118, 124 with respect to the corresponding frames 108, 114, 120. For example, each strut 136, 138, 140 may be coupled to a hydraulic cylinder of the respective hydraulic circuit 148, 150, 152. The hydraulic circuits 148, 150, 152 may control flow of fluid into the corresponding hydraulic cylinders and cause movement of the hydraulic cylinders. Such movement of the respective hydraulic cylinders may drive movement of the struts 136, 138, 140 and, therefore, of the wheels 112, 118, 124 relative to the respective frames 108, 114, 120. For example, directing fluid flow into the hydraulic cylinders may drive the wheels 112, 118, 124 to move relative to the frames 108, 114, 120 to move the frames 108, 114, 120 away from the field 100, and directing fluid flow out of the hydraulic cylinders may drive the wheels 112, 118, 124 to move relative to the frames 108, 114, 120 to move the frames 108, 114, 120 toward the field 100. Alternatively, directing fluid flow into the hydraulic cylinders may drive the wheels to move relative to the frames to move the frames toward the field 100, and directing fluid flow out of the hydraulic cylinders may drive the wheels to move relative to the frames to move the frames away from the field 100. In further embodiments, the agricultural implement may include a single, common hydraulic circuit having the hydraulic cylinders coupled to the respective struts, and fluid may be directed through the hydraulic circuit to drive movement of hydraulic cylinders independently of one another.

The control system 142 is communicatively coupled to the hydraulic circuits 148, 150, 152 and may operate the hydraulic circuits 148, 150, 152 to adjust the positions of the frames 108, 114, 120 relative to the field 100. For example, the control system 142 is communicatively coupled to respective valves (e.g., solenoid valves) of the hydraulic circuits 148, 150, 152 and may output control signal(s) to instruct the respective valves to adjust their positions to control fluid flow into and/or out of the hydraulic cylinders. In this way, the control system 142 may output the control signal(s) to drive movement of the wheels 112, 118, 124 with respect to the frames 108, 114, 120 via the hydraulic circuits 148, 150, 152 to adjust the position of the frames 108, 114, 120 relative to the field 100.

The control system 142 may independently control the hydraulic circuits 148, 150, 152 to adjust the positions of the frames 108, 114, 120 relative to the field 100. As an example, the control system 142 may output a first control signal to cause one of the frames 108, 114, 120 and, therefore, a corresponding one of the ground engagement tools 110, 116, 122 to move toward the field 100 via an associated hydraulic circuit 148, 150, 152, the control system 142 may output a second control signal to cause another of the frames 108, 114, 120 and, therefore, a corresponding one of the ground engagement tools 110, 116, 122 to move away from the field 100 via an associated hydraulic circuit 148, 150, 152, and the control system 142 may cause a remaining one of the frames 108, 114, 120 to maintain its position relative to the field 100 via an associated hydraulic circuit 148, 150, 152. The independent control of the positioning of the frames 108, 114, 120 may enable increased control of the agricultural implement 54'. For example, the different positions of the ground engagement tools 110, 116, 122 with respect to the field 100 may be adjusted and established more suitably or desirably, such as based on respective conditions or parameters associated with the different sections 102, 104, 106.

Although the control system 142 is configured to cause the positions of the frames 108, 114, 120 relative to one another in the illustrated embodiment, in additional or alternative embodiments, the agricultural implement may include a single frame with ground engagement tools at different sections, and the control system may adjust the frame (e.g., a shape, an orientation, a positioning, a configuration of the frame) to move the ground engagement tools relative to the field. In other words, the control system may adjust a single frame to move multiple ground engagement tools relative to the field.

The control system 142 may also cause the respective positions of the ground engagement tools 110, 116, 122 to adjust with respect to the corresponding frames 108, 114, 120. As an example, the control system 142 may cause the ground engagement tools 110, 116, 122 to extend toward the field 100 or retract away from the field 100 to adjust the respective positions and/or the respective depths of insertion of the ground engagement tools 110, 116, 122 with respect to the field 100. In certain embodiments, the respective hydraulic circuits 148, 150, 152 may be configured to move the ground engagement tools 110, 116, 122 and may be utilized to adjust movement of the ground engagement tools 110, 116, 122. For instance, each ground engagement tool 110, 116, 122 may be coupled to a respective hydraulic cylinder (e.g., an additional hydraulic cylinder separate from the hydraulic cylinders coupled to the struts 136, 138, 140), and fluid flow into and out of the hydraulic cylinders may cause the hydraulic cylinders to drive movement of the ground engagement tools 110, 116, 122 relative to the frames 108, 114, 120. The control system 142 may output control signal(s) to cause the hydraulic cylinders to move, such as by causing movement of valves that control fluid flow into and/or out of the hydraulic cylinders, thereby driving movement of the ground engagement tools 110, 116, 122 relative to the field 100.

The control system 142 may operate the hydraulic circuits 148, 150, 152 to cause the ground engagement tools 110, 116, 122 to move independently of one another, thereby enabling greater control of the ground engagement tools 110, 116, 122. Moreover, the control system 142 may operate the hydraulic circuits 148, 150, 152 to cause the ground engagement tools 110, 116, 122 to move relative to the frames 108, 114, 120 independently of movement of the wheels 112, 118, 124 relative to the frames 108, 114, 120. By way of example, the control system 142 may output a control signal to cause one of the frames 108, 114, 120 to move away from the field 100 and output an additional control signal to cause a corresponding one of the ground engagement tools 110, 116, 122 to move relative to the associated frame 108, 114, 120 and away from the field 100, thereby causing increased movement of such a ground engagement tool 110, 116, 122 away from the field 100. The control system 142 may also output a control signal to cause one of the frames 108, 114, 120 to move toward the field 100 and output an additional control signal to cause a corresponding one of the ground engagement tools 110, 116, 122 to move relative to the associated frame 108, 114, 120 and toward the field 100, thereby causing increased movement of such a ground engagement tool 110, 116, 122 toward the field 100. The control system 142 may further output a control signal to cause one of the frames 108, 114, 120 to move away from the field 100 and output an additional control signal to cause a corresponding one of the ground engagement tools 110, 116, 122 to move relative to the associated frame 108, 114, 120 toward the field 100. Such movement may substantially maintain the position of such a ground engagement tool 110, 116, 122 relative to the field 100. In additional or alternative embodiments, control signals may adjust the frames alone (e.g., to adjust the frames without adjusting the ground engagement tools), or control signals may adjust the ground engagement tools alone (e.g., to adjust the ground engagement tools without adjusting the frames). In further embodiments, separate hydraulic circuits may be used to control movement of the wheels and the ground engagement tools, and the control system may be configured to operate each hydraulic circuit independently of one another to cause independent movement of the ground engagement tools and the frames relative to the field. Further still, other types of components, such as electromechanical actuators (e.g., linear actuators, rotary actuators), pneumatic actuators, inflatable bladders, or a combination thereof, may be used to control movement of the wheels and/or of the ground engagement tools.

Although the illustrated agricultural implement includes a single ground engagement tool for each section, each section of an additional or alternative agricultural implement may include multiple ground engagement tools for each section. The control system may be configured to control each ground engagement tool independently of one another. That is, the control system may adjust multiple ground engagement tools of the same section. Indeed, the ground engagement tools of the same section may be adjusted to different positions.

The control system 142 is configured to operate the agricultural implement 54' to cause the ground engagement tools 110, 116, 122 to move relative to the field 100 based on an indication of potential slip between the field 100 and work vehicle tires/tracks 60. In some embodiments, the control system 142 may cause the ground engagement tools 110, 116, 122 to reduce engagement with (e.g., reduce a depth of insertion within) the field 100 to reduce likelihood that the engagement between the ground engagement tools 110, 116, 122 with the field 100 may cause slip of the work vehicle tires/tracks 60. Slip of the work vehicle tires/tracks 60 occurs when a speed (e.g., a linear speed) of the tires/tracks 60 is different from (e.g., greater than) an expected speed, such as a ground speed (e.g., a travel speed, a linear speed) of the work vehicle 52. In other words, the tires/tracks 60 may slip with respect to the field 100, rather than rotate along the field 100. Increased engagement between the ground engagement tools 110, 116, 122 and the field 100 may increase the likelihood of slip of the work vehicle tires/tracks 60. For instance, increased engagement between the ground engagement tools 110, 116, 122 and the field 100 may increase the horizontal force acting against the traction force of the tires/tracks 60. When the horizontal force applied by the ground engagement tools is greater than the traction force of the tires/tracks 60, the tires/tracks 60 may slip on the field 100.

Thus, reducing engagement between the ground engagement tools 110, 116, 122 and the field 100 may reduce the likelihood of slip of the work vehicle tires/tracks 60, and desirable movement and/or efficient operation of the agricultural system 50 may be achieved. For this reason, the control system 142 may monitor a parameter associated with slip (e.g., a parameter indicative of potentially causing slip of the work vehicle tires/tracks 60) at the different sections 102, 104, 106 of the agricultural implement 54'. To this end, each section 102, 104, 106 may include a respective sensor configured to determine a parameter associated with slip at a corresponding section 102, 104, 106. For example, the first section 102 may include a first sensor 154 (e.g., coupled to the first frame 108) configured to determine a parameter associated with slip at the first section 102, the second section 104 may include a second sensor 156 (e.g., coupled to the second frame 114) configured to determine a parameter associated with slip at the second section 104, and the third section 106 may include a third sensor 158 (e.g., coupled to the third frame 120) configured to determine a parameter associated with slip at the third section 106. The parameter may include a linear speed of the wheels 112, 118, 124 of each section 102, 104, 106. For example, the linear speed may be approximately equal to a target speed or an expected speed for a no-slip condition in which an amount of slip is less than a threshold amount of slip. The target speed may be based on a ground speed of the section 102, 104, 106, such as during linear or straight movement of the section 102, 104, 106, and/or based on a radius of curvature of the section 102, 104, 106, such as during rotational movement of the section 102, 104, 106. The ground speed and/or the radius of curvature may be determined via a global positioning system (GPS), a speed sensor (e.g., a speedometer), a position sensor, another suitable technique, or any combination thereof. The target speed for each section 102, 104, 106 may be the same or may be different from one another (e.g., the target speed may be different for instances in which the sections 102, 104, 106 travel at different ground speeds, such as during a turn). A difference between the linear speed and the target speed (e.g., the linear speed being greater than the target speed) may indicate a potential slip condition that may cause slippage of the work vehicle tires/tracks 60. Additionally or alternatively, the parameter may include a moisture content at each section 102, 104, 106, an amount of force (e.g., a draft load) imparted onto the ground engagement tool 110, 116, 122 of each section 102, 104, 106, a drag force at a portion (e.g., the wheels 112, 118, 124) of each section 102, 104, 106, an amount of field debris (e.g., soil buildup) at each section 102, 104, 106, another suitable parameter, or any combination thereof. As such, the sensors 154, 156, 158 may include any of a variety of types of sensors, including a force sensor, an optical sensor, a position sensor, or any combination thereof.

The control system 142 is communicatively coupled to each of the sensors 154, 156, 158 and may receive sensor data indicative of the respective parameters associated with slip at the different sections 102, 104, 106. The control system 142 may then output one or more control signals based on the received sensor data. By way of example, the control system 142 may compare the respective parameter values (e.g., the linear speed of the wheels 112, 118, 124) with target ranges of values (e.g., expected linear speeds of the wheels 112, 118, 124), in which each target range of values indicates substantially no potential of causing slippage of the work vehicle tires/tracks 60. In response to the parameter value of one of the sections 102, 104, 106 being within the respective target range of values, thereby indicating the current operation of the section 102, 104, 106 may not likely cause slippage of the work vehicle 52, the control system 142 may maintain the position of the corresponding ground engagement tool 110, 116, 122 of that section 102, 104, 106. However, in response to the parameter value of one of the sections 102, 104, 106 being outside of the respective target range of values, thereby indicating the current operation of the section 102, 104, 106 may cause slippage of the work vehicle tires/tracks 60, the control system 142 may cause the corresponding ground engagement tool 110, 116, 122 of that section 102, 104, 106 to move and reduce engagement with the field 100. Thus, the control system 142 may reduce the likelihood that the current operation of the agricultural implement 54' causes slippage of the work vehicle tracks/tires 60 to facilitate movement of the work vehicle 52 and/or operation of the agricultural system 50.

Moreover, independent control of the movement of the ground engagement tools 110, 116, 122 may enable more suitable positioning of the respective ground engagement tools 110, 116, 122. For example, each ground engagement tool 110, 116, 122 may be moved to a different position with respect to the field 100 based on the parameter value associated with slip at the respective section 102, 104, 106. Indeed, the control system 142 may cause each ground engagement tool 110, 116, 122 to move to a different depth of insertion within the field 100 based on the received sensor data. In this way, the positioning of the ground engagement tools 110, 116, 122 relative to the field 100 may enable different sections 102, 104, 106 to perform more suitable farming operations via the ground engagement tools 110, 116, 122 while reducing the likelihood of causing slip of the work vehicle tires/tracks 60.

In some embodiments, the control system 142 may cause other operational adjustments based on the received sensor data. As an example, the agricultural system 50 may include a user interface (UI) 160 disposed in the cab 56 of the work vehicle 52. For instance, a user (e.g., an operator) of the agricultural system 50 may utilize the UI 160 during operation of the agricultural system 50. The control system 142 may output an information signal to adjust operation of the UI 160 based on the sensor data, such as to cause the UI 160 to adjust a display (e.g., a display screen), output a light, output a sound, output tactile feedback, provide another notification, or any combination thereof, in response to the sensor data indicating a parameter value of one of the sections 102, 104, 106 is outside of the target range of values. Thus, the UI 160 may provide information to the user regarding the parameter values associated with slip, such as at each section 102, 104, 106, to indicate a potential likelihood of causing slip of the work vehicle tires/tracks 60. As a result, the user may be prompted to adjust operation of the agricultural system 50. For example, the user may utilize the UI 160 (e.g., a touchscreen, a button, a switch, a dial, a trackpad, a gesture identifier) to provide a user input to the control system 142 that then causes the control system 142 to output a control signal to adjust operation of the agricultural system 50 (e.g., adjust movement of the ground engagement tools 110, 116, 122) accordingly. Additionally or alternatively, the control system may output a control signal to adjust another component of the agricultural system, such as a speed control system (e.g., to reduce a speed of the agricultural system to reduce the likelihood of causing slip of the work vehicle tires/tracks), in response to determining one of the parameter values is outside of the respective target range of values.

Figure 3:
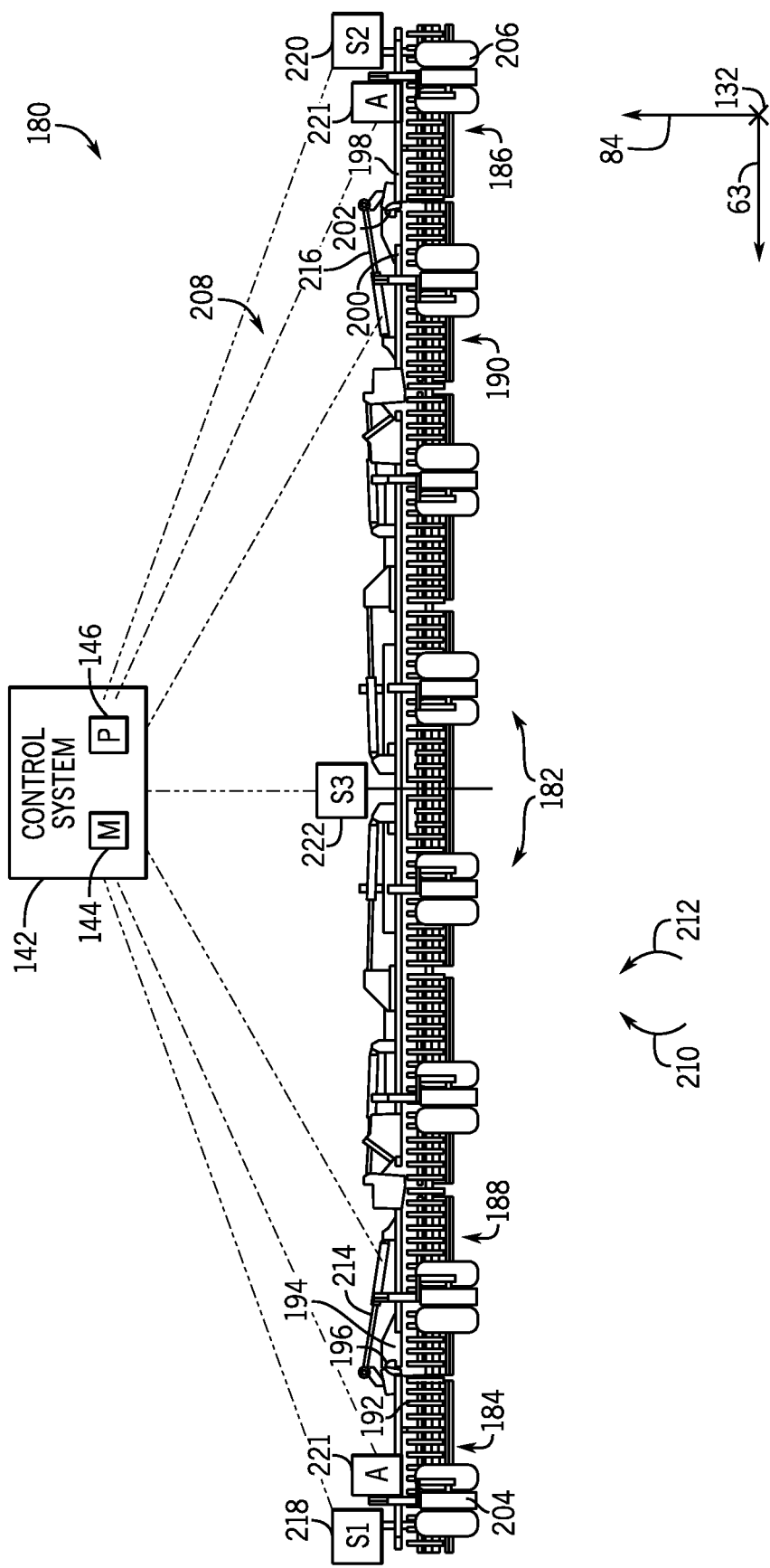
FIG. 3 is a front view of an embodiment of an agricultural implement that may be employed by the agricultural system of FIG. 1, in accordance with an aspect of the present disclosure.

FIG. 3 is a front view of an embodiment of an agricultural implement 180 that may be employed by the agricultural system of FIG. 1. The agricultural implement 180 includes multiple sections arranged in a side-by-side configuration along the lateral axis 63. For example, the agricultural implement 180 includes center sections 182 positioned most interiorly along the lateral axis 63. The agricultural implement 180 also includes a first outer wing section 184 and a second outer wing section 186 positioned at opposite sides of one another and most exteriorly along the lateral axis 63. The agricultural implement 180 further includes a first inner wing section 188 positioned adjacent to and interiorly with respect to the first outer wing section 184 along the lateral axis 63, as well as a second inner wing section 190 positioned adjacent to and interiorly with respect to the second outer wing section 186 along the lateral axis 63. In additional or alternative embodiments, the agricultural implement may include sections that are arranged in a different manner, such as along the longitudinal axis 132.

Each of the sections 182, 184, 186, 188, 190 includes respective wheels configured to enable movement of the agricultural implement 180 along a field during operation. Each of the sections 182, 184, 186, 188, 190 may also include a respective ground engagement tool configured to engage with the field during operation. In additional or alternative embodiments, certain sections may not include wheels, and/or certain sections may have a different quantity of ground engagement tools (e.g., more than one ground engagement tool, no ground engagement tools). Furthermore, the sections 182, 184, 186, 188, 190 are movably coupled to one another. For example, the first outer wing section 184 includes a first frame 192, the first inner wing section 188 includes a second frame 194, and the first frame 192 and the second frame 194 are coupled to one another at a first pivot connection 196. The second outer wing section 186 includes a third frame 198, the second inner wing section 190 includes a fourth frame 200, and the third frame 198 and the fourth frame 200 are coupled to one another at a second pivot connection 202. The first frame 192 may rotate relative to the second frame 194 via the first pivot connection 196, thereby enabling the first outer wing section 184 to rotate relative to the first inner wing section 188. The third frame 198 may rotate relative to the fourth frame 200 via the second pivot connection 202, thereby enabling the second outer wing section 186 to rotate relative to the second inner wing section 190. The agricultural implement 180 may also include similar features to enable movement of other sections, such as rotation of the first inner wing section 188 relative to the center sections 182, rotation of the second inner wing section 190 relative to the center sections 182, and/or rotation of the center sections 182 relative to any other section.

In the illustrated embodiment, the agricultural implement 180 is in an extended configuration 208 (e.g., a fully extended configuration) in which the first outer wing section 184 extends outwardly from the first inner wing section 188, and the second outer wing section 186 extends outwardly from the second inner wing section 190. As a result, first wheels 204 of the first outer wing section 184 (e.g., attached to the first frame 192) and second wheels 206 of the second outer wing section 186 (e.g., attached to the third frame 198) may be in full engagement with the field. For example, the frames 192, 194, 198, 200 may extend substantially along a common axis (e.g., along the lateral axis 63) in the extended configuration 208.

The first frame 192 may be rotated about the second frame 194 in a first rotational direction 210 (e.g., toward the central sections 182) about the longitudinal axis 132 via the first pivot connection 196. Such rotation raises the first wheels 204 relative to the field. The rotation of the first frame 192 in the first rotational direction 210 may also raise a ground engagement tool of the first outer wing section 184 relative to the field. Similarly, the third frame 198 may be rotated about the fourth frame 200 in a second rotational direction 212 (e.g., toward the central sections 182) about the longitudinal axis 132 via the second pivot connection 202. Such rotation may raise the second wheels 206 and a ground engagement tool of the second outer wing section 186 relative to the field.

The agricultural implement 180 may include actuators that are configured to cause movement between the first frame 192 and the second frame 194, as well as between the third frame 198 and the fourth frame 200. By way of example, a first actuator 214 is coupled to the first frame 192 and to the second frame 194. First movement (e.g., retraction) of the first actuator 214 causes the first frame 192 to rotate in the first rotational direction 210 to retract the first outer wing section 184 toward the center sections 182, and second movement (e.g., extension) of the first actuator 214 causes the first frame 192 to rotate in the second rotational direction 212 to extend the first outer wing section 184 away from the center sections 182. A second actuator 216 is coupled to the third frame 198 and to the fourth frame 200. First movement (e.g., retraction) of the second actuator 216 causes the third frame 198 to rotate in the second rotational direction 212 to retract the second outer wing section 186 toward the center sections 182, and second movement (e.g., extension) of the second actuator 216 causes the third frame 198 to rotate in the first rotational direction 210 to extend the second outer wing section 186 away from the center sections 182. In some embodiments, the actuators 214, 216 include hydraulic cylinders, and movement of the actuators 214, 216 may be effectuated via directing of a fluid into and/or out of the hydraulic cylinders. In additional or alternative embodiments, the actuators may include any other suitable actuator (e.g., an electromechanical actuator, a pneumatic actuator) configured to cause movement of the first outer wing section 184 and/or of the second outer wing section 186.

The control system 142 is communicatively coupled to the actuators 214, 216 and may operate the actuators 214, 216 to cause the first outer wing section 184 and/or the second outer wing section 186 to move. For example, the control system 142 is configured to instruct the actuator(s) 214, 216 to rotate the first outer wing section 184 and/or the second outer wing section 186, respectively, toward the center sections 182 based on parameters associated with slip (e.g., parameters indicative of potential to cause of slip of the work vehicle tires/tracks). In some circumstances, a determination may be made that the linear speed of the wheels 204 at the first outer wing sections 184 and/or the linear speed of the wheels 206 at the second outer wing section 186 may be outside of respective target range(s) of speeds (e.g., the same target range of speeds, a different target range of speeds). For instance, a first sensor 218 is configured to determine the linear speed of the first wheels 204, and a second sensor 220 is configured to determine the linear speed of the second wheels 206. The first sensor 218 and the second sensor 220 are communicatively coupled to the control system 142 and may output sensor data indicative of the determined linear speeds. In response to the linear speed being outside of a target range of speeds, the control system 142 may instruct a corresponding one of the actuators 214, 216 to rotate the associated outer wing section 184, 186 toward the center sections 182, thereby disengaging the ground engagement tool of the associated outer wing section 184, 186 from the field to reduce the potential of causing slip of the work vehicle.

Additionally or alternatively, the control system may instruct the ground engagement tool of the associated outer wing section to move relative to the corresponding frame. For example, each outer wing section may include an actuator 221 coupled to the ground engagement tools, and the control system may instruct the actuators 221 to move the respective ground engagement tools relative to the corresponding frame of the outer wing section. For instance, in response to the linear speed being outside of a target range of speeds, the control system may instruct a corresponding one of the actuators 221 to retract with respect to the frame to reduce engagement between the ground engagement tool and the field.

The control system 142 may also instruct the actuators 214, 216 to move the outer wing sections 184, 186 based on parameters associated with slip determined at other sections of the agricultural implement 180. By way of example, the control system 142 may be communicatively coupled to a third sensor 222, which may determine a parameter associated with slip at the center sections 182. The control system 142 may instruct the actuator(s) 214, 216 to move the outer wing sections 184, 186 based on sensor data received from the third sensor 222, the sensor data providing a parameter associated with slip at the center sections 182. For instance, extending the outer wing sections 184, 186 away from the center sections 182 (e.g., to adjust the agricultural implement 180 toward the illustrated extended configuration 208) may transfer the weight of the agricultural implement 180 away from the center sections 182. The weight transfer away from the center sections 182 may enable reduced engagement between the ground engagement tools of the center sections 182 and the field. As a result, the likelihood of slip of the work vehicle tires/tracks caused by the center sections 182 may be reduced. For this reason, in response to the determined parameter associated with slip at the center sections 182 indicating an undesirable potential likelihood of causing slip of the work vehicle (e.g., the parameter value determined by the third sensor 222 is outside of a target range of values), the control system 142 may instruct the actuator(s) 214, 216 to rotate the first outer wing section 184 and/or the second outer wing section 186 away from the center sections 182 to reduce the likelihood of causing slip of the work vehicle tires/tracks. During such operations, the control system 142 may instruct the actuators 221 to move the ground engagement tools to avoid engagement with the field when the outer wing sections 184, 186 are extended away from the center sections 182. Such adjustment of the ground engagement tools may avoid potentially increased likelihood of slip of the work vehicle tires/tracks and/or avoid undesirable operation of the agricultural system that may otherwise occur as a result of engagement between the ground engagement tools of the outer wing sections 184, 186 and the field.

The control system 142 may operate the actuators 214, 216 independently of one another. For example, the control system 142 may instruct one of the actuators 214, 216 to rotate the corresponding outer wing section 184, 186 toward the center sections 182, thereby disengaging the ground engagement tool of the outer wing section 184, 186 from the field, while instructing the other of the actuators 214, 216 to rotate the corresponding outer wing section 184, 186 away from the center sections 182, thereby engaging the ground engagement tool of the other wing section 184, 186 with the field. Additionally or alternatively, the control system may operate the actuators to independently adjust the position of the ground engagement tools, such as to independently control engagement between the ground engagement tools and the field. Indeed, the control system 142 may selectively operate the actuators 214, 216, 221 based on the detected parameters associated with slip at the different sections 182, 184, 186, 188, 190 to position the ground engagement tools (e.g., to adjust the different engagements between the ground engagement tools and the field) more suitably based on the different parameter values associated with slip at the respective sections 182, 184, 186, 188, 190.

Figure 4:
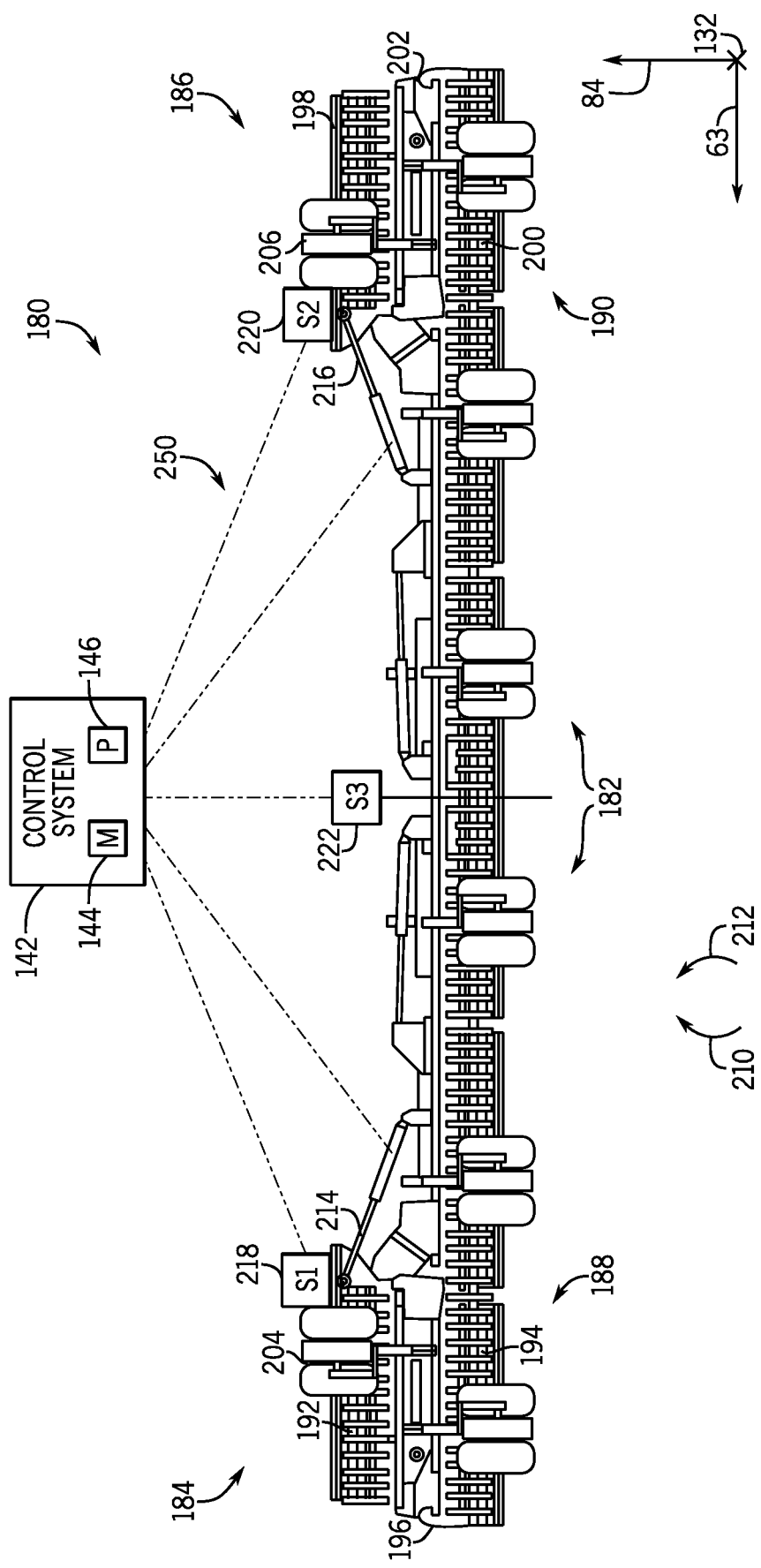
FIG. 4 is a front view of the agricultural implement of FIG. 3, in accordance with an aspect of the present disclosure.

FIG. 4 is a front view of the agricultural implement 180 of FIG. 3. In the illustrated embodiment, the first frame 192 of the first outer wing section 184 is positioned atop the second frame 194 of the first inner wing section 188 (e.g., the first frame 192 and the second frame 194 are aligned with one another along the lateral axis 63 and are positioned adjacent to one another along the vertical axis 84). Additionally, the third frame 198 of the second outer wing section 186 is positioned atop the fourth frame 200 of the second inner wing section 190 (e.g., the third frame 198 and the fourth frame 200 are aligned with one another along the lateral axis 63 and are positioned adjacent to one another along the vertical axis 84). As a result, the first wheels 204 of the first outer wing section 184 and the second wheels 206 of the second outer wing section 186 are not in engagement with the field. Such an arrangement of the agricultural implement 180 may be a retracted configuration 250 (e.g., a fully retracted configuration).

As an example, the control system 142 may instruct the actuators 214, 216 to rotate the outer wing sections 184, 186 toward the center sections 182 to transition the agricultural implement 180 from the extended configuration to the retracted configuration 250 to reduce the likelihood of causing slip of the work vehicle tires/tracks. For instance, the parameter values associated with slip at the outer wing sections 184, 186 may indicate an undesirable potential likelihood of causing slip of the work vehicle tires/tracks even after the ground engagement tools of the outer wing sections 184, 186 are not in engagement with the field. In response, the outer wing sections 184, 186 may be rotated such that the wheels 204, 206 are no longer engaged with the field, thereby further reducing the likelihood of causing slip of the work vehicle tires/tracks.

Additionally or alternatively, the control system may instruct the actuators to rotate the outer wing sections toward the center sections to increase weight distributed onto the center sections. For instance, the third sensor may determine the operating parameter indicates a low potential likelihood of causing slip of the work vehicle tires/tracks by the center sections (e.g., the operating parameter is within a target range of values). Therefore, engagement between the ground engagement tool(s) of the center sections and the field may be increased. In response, the control system may instruct the actuators to rotate the outer wing sections toward the center sections to transfer weight toward the center sections, thereby enabling increased engagement between the ground engagement tool(s) of the center sections and the field. Increased engagement between the ground engagement tool (s) of the center sections and the field may enable the agricultural implement to operate more efficiently or desirably.

Although the illustrated agricultural implement 180 includes multiple frames 192, 194, 198, 200 in FIGS. 3 and 4, it should be noted that in additional or alternative embodiments, the agricultural implement may include a single frame with multiple ground engagement tools positioned at different sections. In such embodiments, the control system may operate the actuators to adjust the frame (e.g., a position, an orientation, a shape, a configuration), thereby adjusting distribution of a weight of the frame and/or adjusting engagement between the ground engagement tools and the field to adjust the likelihood of slip of the work vehicle tires/tracks.

Figure 5:
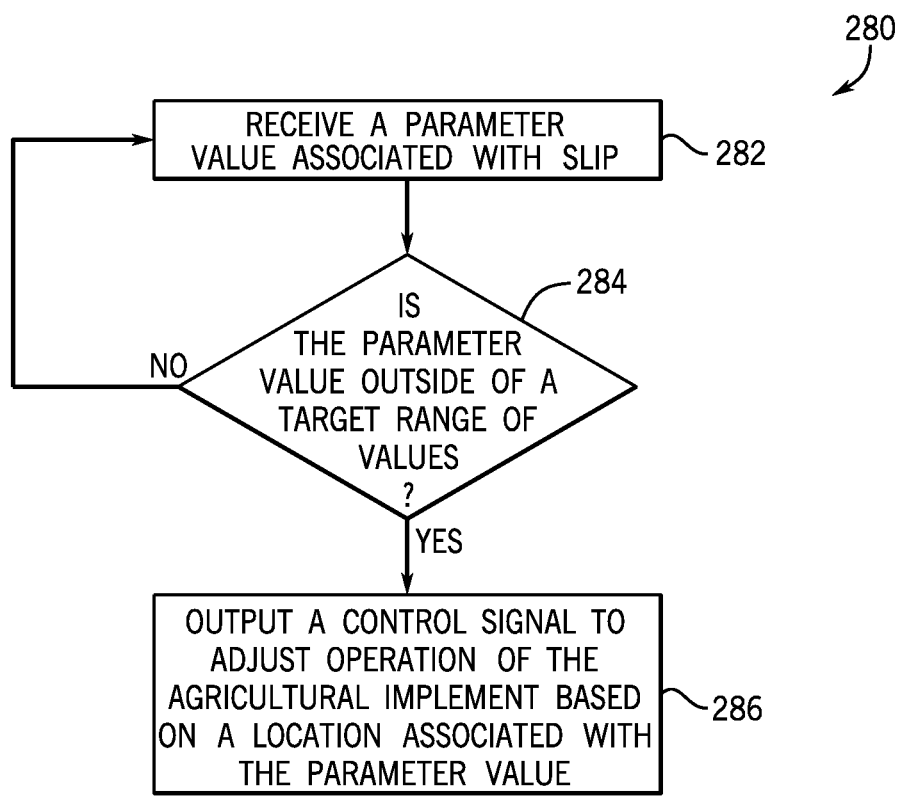
FIG. 5 is a flow diagram of an embodiment of a method for operating the agricultural system of FIG. 1 based on an operating parameter associated with slip, in accordance with an aspect of the present disclosure.

FIG. 5 is a flow diagram of an embodiment of a method 280 for operating the agricultural system of FIG. 1 based on an operating parameter associated with slip. In some embodiments, the method may be performed by a single component or system, such as by the control system (e.g., the processor) disclosed herein. In additional or alternative embodiments, multiple components or systems may perform the separate operations of the method 280. It should also be noted that additional operations may be performed with respect to the described method 280. Moreover, certain operations of the method 280 may be removed, modified, and/or performed in a different order.

At block 282, a parameter value associated with slip of work vehicle tire/tracks of the agricultural system is received. For example, the parameter value may be received via sensor data, such as from a sensor of the agricultural implement. In some embodiments, the parameter value includes a linear speed of a wheel of the agricultural implement, which may include a speed of a surface of the wheel along the field surface. In additional or alternative embodiments, the parameter value may include a field condition (e.g., moisture content, soil buildup), a force imparted onto a ground engagement tool or other part of the agricultural implement, a drag force associated with the agricultural implement, another suitable parameter, or any combination thereof.

At block 284, the parameter value is compared to a target range of values (e.g., an expected range of values), and a determination is made regarding whether the parameter value is outside of the target range of values. For example, the target range of values may be associated with a no-slip condition in which there is little or no potential of causing slip of the work vehicle tires/tracks. Thus, the parameter value being at or within the target range of values may indicate that the current operation of the agricultural implement may not cause slip of the work vehicle tires/tracks, thereby maintaining a desirable operation of the agricultural system. For instance, the target range of values may be associated with a ground speed and/or a radius of curvature of movement of the agricultural system (e.g., of the work vehicle, of the agricultural implement, of a ground engagement tool), which may be determined via a GPS, a speed sensor, or other suitable technique. For this reason, in response to determining the parameter value is not outside of the target range of values, no further action may be performed to try to adjust the operation of the agricultural implement. For instance, the positioning of the sections of the agricultural implement may be maintained. Thus, efficient or desirable operation of the agricultural system may be maintained. The parameter value associated with slip may continue to be received and monitored to determine whether there is potential slip.

However, in response to determining that the parameter value is outside of the target range of values, a control signal may be output to adjust the operation of the agricultural implement, as shown at block 286. By way of example, the parameter value being outside of the target range of values may indicate that the current operation of the agricultural system may cause slip of the work vehicle tires/tracks. Thus, the control signal may adjust the operation of the agricultural implement to reduce the likelihood of causing slip of the work vehicle tires/tracks. For instance, a location associated with the parameter value may be determined, and the control signal may be output based on the location to reduce the likelihood of causing slip of the work vehicle tires/tracks. However, certain other operations of the agricultural implement (e.g., operations that would not otherwise reduce the likelihood of causing slip of the work vehicle tires/tracks) may be maintained. In this way, the likelihood of slip of the work vehicle tires/tracks may be reduced without substantially affecting (e.g., diminishing) the operation of the agricultural implement. Additionally or alternatively, an information signal may be output based on the location associated with the parameter value that is outside of the target range of values to cause a UI to provide an output. For instance, the information signal may cause the UI to provide information indicative of the location at, in, or on the agricultural implement that may potentially cause slip of the work vehicle tires/tracks and prompt a user to manually adjust the operation of the agricultural system in response.

In some embodiments, the agricultural implement may include multiple ground engagement tools associated with respective locations at, in, or on the agricultural implement, and the control signal may be output to reduce engagement between one of the ground engagement tools and the field (e.g., a field surface) based on the location of the ground engagement tool corresponding to the location associated with the parameter value that is outside of the target range of values. By way of example, the agricultural implement may include sections that each include a ground engagement tool attached to a frame. Respective parameter values associated with slip at each section may be determined. In response to determining one of the parameter values is outside of the target range of values, the section associated with the parameter value may be determined. The control signal may then be output to reduce engagement between the ground engagement tool of the section and the field, such as by adjusting the frame relative to the field and/or relative to an additional frame (e.g., by moving the frame away from the field) and/or by adjusting the ground engagement tool relative to the frame (e.g., by moving the ground engagement tool away from the field). Reducing the engagement between the ground engagement tool and the field may include reducing a surface area of contact between the ground engagement tool and the field, such as by reducing a depth of insertion of the ground engagement tool within the field (e.g., from a relatively deeper depth of insertion to a relatively shallower depth of insertion) or removing the ground engagement tool from the field. In such embodiments, the control signal may be output to instruct an actuator to move a component of the section, thereby reducing the engagement between the ground engagement tool and the field.

Additionally or alternatively, another section of the agricultural implement may be adjusted to reduce engagement of the ground engagement tool of the section associated with the parameter value indicating potential slip. For example, the parameter value that is outside of the target range of values may be associated with center section(s) of the agricultural implement. In response, a control signal may be output to adjust the operation of the agricultural implement to transfer the weight of the agricultural implement away from the center section(s). For instance, the control signal may cause outer wing section(s) to rotate and extend away from the center section(s), thereby transferring weight from the center section(s) toward the outer wing section(s). The reduced weight at the center section(s) may reduce the engagement between the ground engagement tool of the center section(s) and the field, thereby reducing the likelihood that the ground engagement tool(s) of the center section(s) cause slip of the work vehicle tire/tracks.

The operational adjustments of the agricultural implement may be selectively effectuated based on the location associated with the parameter value. For example, the control signal may be output to move a particular section of the agricultural implement relative to another section of the agricultural implement. However, the relative positioning of other sections of the agricultural implement may be maintained. For instance, the ground engagement tool of the section associated with causing potential slip of the work vehicle tires/tracks may be moved based on the location of the ground engagement tool corresponding to the location associated with the parameter value that is outside of the target range of values, but the position of an additional ground engagement tool of another section may be maintained based on the location of the additional engagement tool not corresponding to the location associated with the parameter value that is outside of the target range of values. In this manner, the likelihood of causing slip of the work vehicle tires/tracks may be reduced, while the operation of the agricultural implement (e.g., by another section that may not cause potential slip of the work vehicle tires/tracks) may remain efficient and/or desirable. Indeed, different sections may be independently adjusted to position the ground engagement tools at respective positionings with respect to the field that may be more suitable for the particular parameter values associated with slip locally determined at the different sections of the agricultural implement.

The method 280 may also be repeatedly or iteratively performed. For instance, after a control signal is output to adjust the operation of the agricultural implement, such as to reduce engagement between a ground engagement tool and the field, the parameter value associated with slip may be received again for comparison to the target range of values. An additional operation may be performed based on the comparison between the parameter value and the target range of values. As an example, an additional control signal may be output to further reduce engagement between the ground engagement tool and the field, such as by moving the ground engagement tool relative to a frame. Additionally or alternatively, an additional control signal may be output to disengage the wheels of a section from the field (e.g., in response to the section potentially causing slip of the work vehicle tires/tracks even when the ground engagement tool is not in engagement with the field). Thus, the operation of the agricultural implement may continue to be adjusted to reduce potential of causing slip of the work vehicle tires/tracks, such as until the parameter value is determined to be within the target range of values.

In some embodiments, additional operations may be performed to increase engagement between a ground engagement tool and the field. By way of example, in response to determining the parameter value is within the target range of values or an additional target range of values (e.g., a nested target range of values), another control signal may be output to adjust the operation of the agricultural implement to increase the engagement between the ground engagement tool and the field. For example, the control signal may cause movement of a frame to which the ground engagement tool is coupled, movement of the ground engagement tool relative to the frame, movement of another section of the agricultural implement (e.g., to transfer weight to the frame having the ground engagement tool), or a combination thereof, to increase the engagement between the ground engagement tool and the field. The increased engagement between the ground engagement tool and the field may enable efficient and/or desirable operation of the agricultural implement without causing slip.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
an agricultural implement comprising a plurality of ground engagement tools, wherein each ground engagement tool of the plurality of ground engagement tools is configured to engage a field; and
a control system comprising a memory storing instructions and a processor configured to execute the instructions to:
receive a signal indicative of a first linear speed associated with a first wheel of a plurality of wheels of the agricultural implement, wherein the first wheel is associated with a first location of a plurality of locations on the agricultural implement;
determine that the first linear speed is outside of a threshold range of linear speeds associated with a no-slip condition;
determine that a first section of ground engagement tools of the plurality of ground engagement tools is associated with the first location; and
output a control signal to reduce engagement of the first section of ground engagement tools with respect to the field in response to the first linear speed being outside the threshold range of linear speeds and the first section of ground engagement tools being associated with the first location.

2. The agricultural system of claim 1, wherein the processor of the control system is configured to execute the instructions to maintain engagement between a second section of ground engagement tools of the plurality of ground engagement tools and the field in response to the second section of ground engagement tools not corresponding to the first location.

3. The agricultural system of claim 1, comprising a first sensor associated with the first wheel and configured to output the signal indicative of the first linear speed associated with the first wheel.

4. The agricultural system of claim 1, wherein the control signal is configured to decrease a field depth of insertion associated with the first section of ground engagement tools.

5. The agricultural system of claim 1, wherein the agricultural implement comprises a frame, the first section of ground engagement tools is coupled to the frame, the agricultural implement comprises a strut coupling the first wheel to the frame, and the processor of the control system is configured to execute the instructions to output the control signal to cause the strut to move the first wheel relative to the frame to reduce the engagement between the first section of ground engagement tools and the field.

6. The agricultural system of claim 1, comprising an actuator, wherein the control system is configured to execute the instructions to output the control signal to instruct the actuator to drive movement of the first section of ground engagement tools relative to the field in response to the first linear speed being outside the threshold range of linear speeds and the first section of ground engagement tools being associated with the first location.

7. The agricultural system of claim 1, comprising a user interface communicatively coupled to the control system, wherein the processor of the control system is configured to execute the instructions to output an additional control signal to cause the user interface to display information indicative of the first location.

8. A non-transitory computer readable medium, comprising instructions that, when executed by processing circuitry, are configured to cause the processing circuitry to:
receive a plurality of signals, each signal of the plurality of signals being indicative of a linear speed associated with a respective wheel of a plurality of wheels coupled to an agricultural implement configured to perform a farming operation on a field;
determine that a first linear speed associated with a first wheel of the plurality of wheels is outside of a threshold range of linear speeds associated with a no-slip condition, wherein the first wheel is associated with a first location on the agricultural implement;
determine that a first section of ground engagement tools of a plurality of ground engagement tools coupled to the agricultural implement is associated with the first location; and
output a control signal to reduce engagement between the first section of ground engagement tools and the field in response to the first linear speed being outside the threshold range of linear speeds and the first section of ground engagement tools being associated with the first location.

9. The non-transitory computer readable medium of claim 8, wherein the instructions, when executed by the processing circuitry, are configured to cause the processing circuitry to:
determine that a second linear speed associated with a second wheel of the plurality of wheels is within the threshold range of linear speeds associated with the no-slip condition, wherein the second wheel is associated with a second location on the agricultural implement; and
maintain engagement between a second section of ground engagement tools of the plurality of ground engagement tools and the field in response to the second linear speed being within the threshold range of linear speeds and the second section of ground engagement tools being associated with the second location.

10. The non-transitory computer readable medium of claim 8, wherein the instructions, when executed by the processing circuitry, are configured to cause the processing circuitry to output the control signal to instruct an actuator to move the first section of ground engagement tools relative to a frame of the agricultural implement to reduce the engagement between the first section of ground engagement tools and the field.

11. The non-transitory computer readable medium of claim 8, wherein the instructions, when executed by the processing circuitry, are configured to:
determine that a second linear speed associated with a second wheel of the plurality of wheels is within an additional threshold range of linear speeds, wherein the second wheel is associated with a second location on the agricultural implement; and
output an additional control signal to increase engagement between a second section of ground engagement tools of the plurality of ground engagement tools and the field in response to the second linear speed being within the additional threshold range of linear speeds and the second section of ground engagement tools being associated with the second location.

12. The non-transitory computer readable medium of claim 8, wherein the control signal is configured to reduce engagement between the first section of ground engagement tools and the field by a first amount, and wherein the instructions, when executed by the processing circuitry, are configured to cause the processing circuitry to:
determine that the first linear speed remains outside of the threshold range of linear speeds after outputting the control signal to reduce the engagement between the first section of ground engagement tools and the field; and
output an additional control signal to further reduce the engagement between the first section of ground engagement tools and the field in response to determining that the first linear speed remains outside of the threshold range of linear speeds, wherein the additional control signal is configured to reduce engagement between the first section of ground engagement tools and the field by a second amount greater than the first amount.

13. The non-transitory computer readable medium of claim 8, wherein the plurality of signals are received from a plurality of sensors, each sensor of the plurality of sensors associated with a respective position of a plurality of positions on the agricultural implement.

14. An agricultural system, comprising:
an agricultural implement comprising a first section and a second section, wherein the first section comprises a first ground engagement tool, the second section comprises a second ground engagement tool, and each of the first ground engagement tool and the second ground engagement tool is configured to engage a field; and
a control system comprising a memory having instructions and a processor configured to execute the instructions to:
determine that a first linear speed associated with a first wheel of a plurality of wheels of the agricultural implement is outside of a threshold range of linear speeds associated with a no-slip condition, wherein the first wheel is associated with a first location on the agricultural implement;
determine that a second linear speed associated with a second wheel of the plurality of wheels of the agricultural implement is within the threshold range of linear speeds, wherein the second wheel is associated with a second location on the agricultural implement;
determine that the first section comprising the first ground engagement tool is associated with the first location;

determine that the second section comprising the second ground engagement tool is associated with the second location;

output a control signal to reduce engagement between the first ground engagement tool of the first section and the field in response to the first linear speed being outside the threshold range of linear speeds and the first section being associated with the first location; and maintain engagement between the second ground engagement tool of the second section and the field in response to the second linear speed being within the threshold range of linear speeds and the second section being associated with the second location.

15. The agricultural system of claim 14, wherein the agricultural implement comprises a third section, and the control signal is configured cause the third section to extend away from the first section to transfer a weight of the agricultural implement from the first section toward the third section to reduce engagement between the first ground engagement tool and the field.

16. The agricultural system of claim 15, wherein the first section comprises a first frame, the third section comprises a second frame, the first frame and the second frame are rotatably coupled to one another at a pivot connection, the agricultural implement comprises an actuator coupled to the first frame and to the second frame, and the processor of the control system is configured to execute the instructions to output the control signal to control the actuator to rotate the second frame relative to the first frame to extend the third section away from the first section to reduce engagement between the first ground engagement tool and the field.

17. The agricultural system of claim 14, comprising a work vehicle coupled to the agricultural implement, wherein the processor of the control system is configured to execute the instructions to determine a potential slip condition of the work vehicle in response to the first linear speed being outside the threshold range of linear speeds.

18. The agricultural system of claim 14, wherein the control signal is configured to reduce engagement between the first ground engagement tool of the first section and the field by a first amount, and wherein the processor of the control system is configured to execute the instructions to:

determine that the first linear speed remains outside of the threshold range of linear speeds after outputting the control signal to reduce the engagement between the first ground engagement tool of the first section and the field; and output an additional control signal to further reduce the engagement between the first ground engagement tool and the field in response to determining that the first linear speed remains outside of the threshold range of linear speeds, wherein the additional control signal is configured to reduce engagement between the first ground engagement tool and the field by a second amount greater than the first amount.

19. The agricultural system of claim 14, wherein the agricultural implement comprises a third section comprising a third ground engagement tool configured to engage the field, and the processor of the control system is configured to execute the instructions to:

determine that a third linear speed associated with a third wheel of the plurality of wheels is within an additional threshold range of linear speeds, wherein the third wheel is associated with a third location on the agricultural implement;

determine that the third section comprising the third ground engagement tool is associated with the third location; and output an additional control signal to increase engagement between the third ground engagement tool of the third section and the field in response to the third linear speed being within the additional threshold range of linear speeds and the third section being associated with the third location.

20. The agricultural system of claim 14, comprising a first sensor associated with the first wheel and a second sensor associated with the second wheel, the first sensor configured to output a first signal indicative of the first linear speed and the second sensor configured to output a second signal indicative of the second linear speed, wherein the processor of the control system is configured to execute the instructions to receive the first signal and the second signal.

* * * * *